United States Patent
Zillgitt et al.

[11] Patent Number: 6,142,655
[45] Date of Patent: Nov. 7, 2000

[54] DEVICE FOR REGULATING LIGHT WIDTH OF HEADLIGHTS FOR VEHICLES, AND VEHICLE PROVIDED THEREWITH

[75] Inventors: Ulrich Zillgitt, Remshalden; Hans-Juergen Lipart, Tuebingen, both of Germany

[73] Assignee: Robert Bosch GmbH, Stuttgart, Germany

[21] Appl. No.: 09/047,879

[22] Filed: Mar. 25, 1998

[30] Foreign Application Priority Data

May 15, 1997 [DE] Germany ............ 197 20 314

[51] Int. Cl.[7] ..................................... B60Q 1/10
[52] U.S. Cl. ............................. 362/466; 362/523
[58] Field of Search ................... 362/459, 464, 362/465, 466, 469, 467, 523, 525, 468, 277, 285; 315/77, 82; 701/49

[56] References Cited

U.S. PATENT DOCUMENTS

| | | | |
|---|---|---|---|
| 4,833,573 | 5/1989 | Miyauchi et al. | 362/466 |
| 5,907,196 | 5/1999 | Hayami | 307/10.8 |

FOREIGN PATENT DOCUMENTS 23 33 983  1/1975  Germany .

*Primary Examiner*—Sandra O'Shea
*Assistant Examiner*—Peggy A. Neils
*Attorney, Agent, or Firm*—Michael J. Striker

[57] ABSTRACT

The device for controlling headlights of a vehicle includes respective adjusting units (20) for adjusting the headlights to vary light widths of the headlights (10); a first sensor unit (24) for measuring a first angular orientation of a first mounting plane of the first sensor unit (24) mounted on a first link element pivotally connected between at least one front wheel and the vehicle body (12); a second sensor unit (28) for measuring a second angular orientation of a second mounting plane of the second sensor unit (28) mounted on a second link element (40,50,60) pivotally connected between at least one rear wheel and the vehicle body (12); a third sensor unit (30) for measuring a third angular orientation of a third mounting plane extending in and fixed in relation to the vehicle body (12); and an evaluating unit (32) for controlling the adjusting units to adjust the light widths of the headlights (10) according to the first, second and third angular orientation measured by the sensor units.

10 Claims, 2 Drawing Sheets

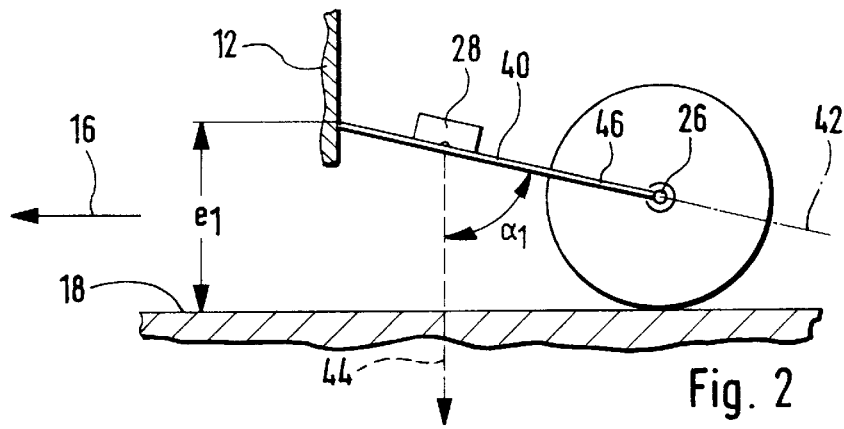
Fig. 2
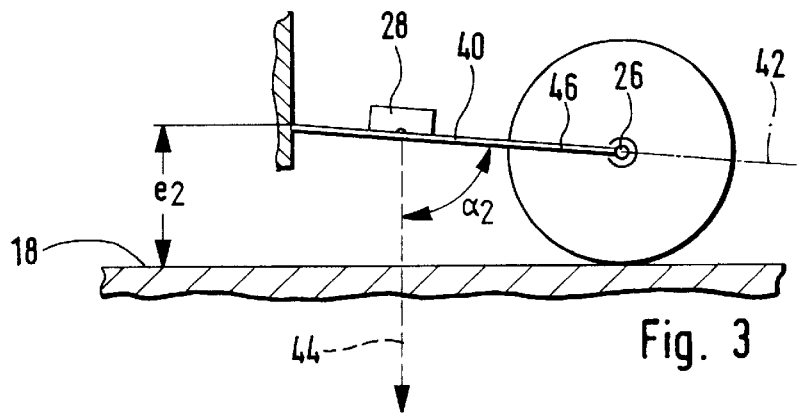
Fig. 3
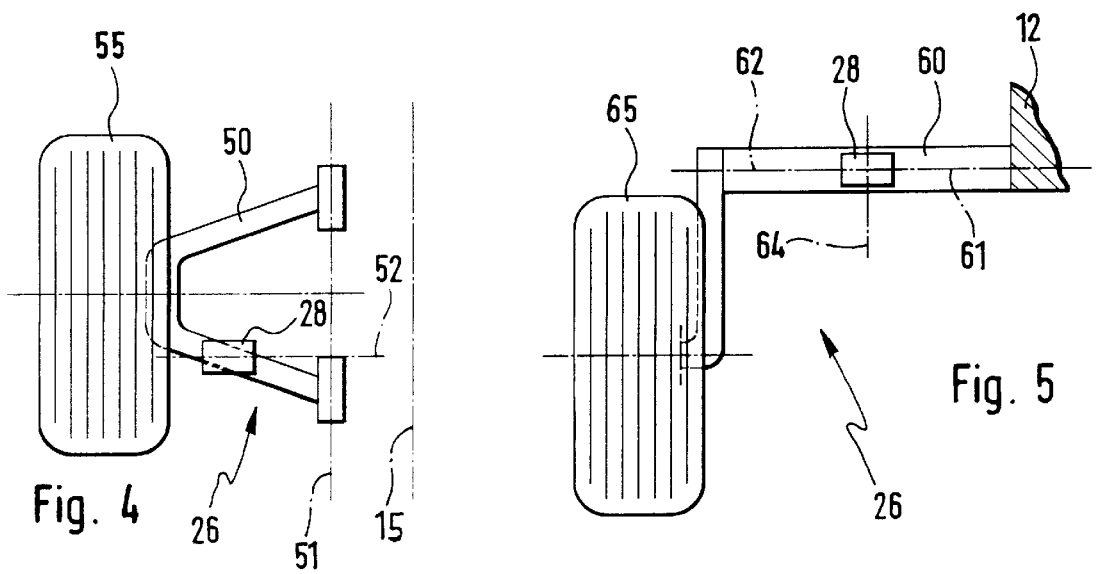
Fig. 4
Fig. 5

DEVICE FOR REGULATING LIGHT WIDTH OF HEADLIGHTS FOR VEHICLES, AND VEHICLE PROVIDED THEREWITH

BACKGROUND OF THE INVENTION

The present invention relates to a device for regulating the light width of headlights for vehicles. The present invention also relates to a vehicle which is provided with the inventive device for regulating the light width of the headlights.

One of such devices is disclosed for example in the German patent document DE 23 33 983. This device has a sensor unit in the region of the front axle and in the region of the rear axle of the vehicle. The sensor unit detects at least indirectly the change of the position of the vehicle in the region of the front axle and the rear axle relative to a roadway. The sensor units are formed as ultrasound sensors including an emitter and a receiver. With the sensor, the ultrasound radiation is emitted to the roadway and detected by the receiver when the ultrasound radiation is reflected from the roadway. The ultrasound sensors are connected with an evaluating device which determines from the signals of the sensors the corresponding distance of the sensors and thereby the vehicle structure from the roadway. From the distance of the sensors at both axles, the evaluating device determines the inclination of the vehicle, and the adjusting devices which are associated with the headlights are controlled by the evaluating device so that the light width of the headlight is maintained at least approximately constantly independently from the inclination of the vehicle. The disadvantage of this known device for regulating the light width is that the operation of the ultrasound sensor units is distorted with certain roadway properties and/or weather conditions, and thereby incorrect adjustment of the light width of the headlight can not be excluded.

SUMMARY OF THE INVENTION

Accordingly, it is an object of present invention to provide a device for regulating the light width of headlights of vehicles which avoids the disadvantages of the prior art.

In keeping with these objects and with others which will become apparent hereinafter, one feature of present invention resides, briefly stated in a device for regulating the light width of headlights of vehicles in which the sensor units are formed as inclination sensor units.

When the device is designed in accordance with the present invention, it has the advantage that the operational safety of the sensor devices is improved since they are formed as inclination sensor units. The inclination sensor units also provide for a possibility of a contactless determination of a change of the position of the vehicle structure.

In accordance with another feature of present invention, at least one additional sensor unit is provided, which is connected with the vehicle structure and also formed as an inclination device. This additional sensor unit can eliminate the influences of the roadway inclination and/or the one-side structure inclination, so that they can not lead to inaccurate adjustment of the light width.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a view showing a wheel suspension of the vehicle in a first loading condition, on an enlarged scale;

FIG. 3 is a view showing a wheel suspension in a second loading condition;

FIG. 4 is a view showing a portion of a modified wheel suspension of the vehicle of FIG. 1; and FIG. 5 is a view showing a portion of a further modified embodiment of a wheel suspension of the vehicle.

DESCRIPTION OF PREFERRED EMBODIMENT

Figure 1:
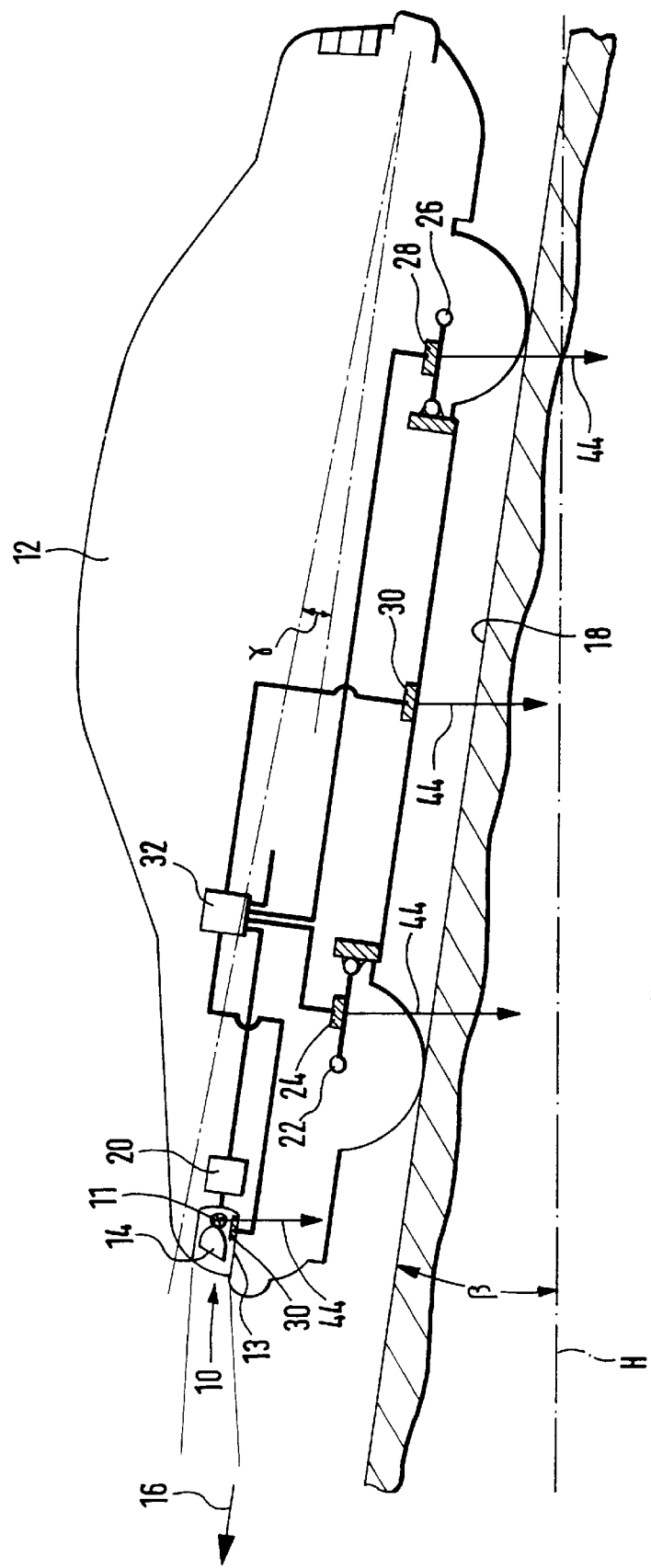
FIG. 1 is a view showing a longitudinal section of a vehicle in a simplified representation.

A vehicle, in particular a motor vehicle illustrated in FIG. 1, has a front side provided in a known manner with two low beam headlights 10, of which only one is shown in FIG. 1. The headlights 10 are connected in a known manner with the structure of the vehicle, in particular with its body 12. With a change of the inclination γ of the vehicle, also the inclination of the headlights 10 and thereby the light width of the light beam emitted by them changes as well. When the vehicle is loaded the light width is increased, which would lead to a blinding of a traffic participant coming from an opposite side. In order to provide for a possibility of an adjustment of the light width of the light beam emitted by the headlights 10, the headlights 10 or at least their reflectors 14 are turnable about a horizontal axis 11. In order to maintain constant the light width of the light beam emitted by the headlights 10 independently from the inclination γ of the vehicle, which can change for example due to a loading, because of a roadway unevenness or because of acceleration processes of the vehicle, a device for regulating the light width is provided in accordance with present invention.

The device includes adjusting units 20 which are associated with the headlights 10 and turn the headlights 10 about the horizontal axis 11. The units also have a sensor unit 24 in the region of the front axle of the vehicle, and a sensor unit 28 in the region of the rear axle 26 of the vehicle. An additional sensor unit 30, as shown in FIG. 1 is arranged on the structure of the vehicle, for example on its body 12. The additional sensor unit 30 can be alternatively arranged on the body 12 of the vehicle as shown in FIG. 1, or in a housing 13 of the headlight 10 which is fixedly connected with the structure or the body 12 of the housing.

The sensor units 24, 28, 30 are connected with an evaluating device 32. The adjusting units 20 are also connected with the evaluating device 32. The sensor units 24, 28, 30 are formed as inclination sensor units. They detect an angle located in a measuring plane and provided between a definite mounting plane and a direction 44 to the center of the earth. For example, each of the inclination sensor units 24, 28, 30 can have a pendulum which is turnable about a vertical axis extending through the measuring plane and is pulled by its weight in direction 44 to the center of the earth. Its inclination relative to the mounting plane is evaluated, for example by a slider of a potentiometer moved by the pendulum over an electrical path. Alternatively, the inclination sensor units 24, 28, 30 can operate in accordance with a capacitative principle. In this case they have a mass which is movable between two capacitor plates, and the capacitance changes during the movement of the mass. Also, the sensor unit can be similar to those used for controlling the release of vehicle safety systems, for example airbag or safety belt.

FIGS. 2 and 3 show for example a wheel suspension of the vehicle on its rear axle 26. The wheel suspension has a longitudinal link 40. Its end region furthest forward in the forward traveling direction 16 of the vehicle is for example supported on the structure 12 of the vehicle, while its rear end region serves for the wheel guide. The longitudinal link 40 extends in a vertical longitudinal plane 46 of the vehicle. The inclination sensing unit 28 is arranged for example on the longitudinal link 40 and detects the angle $\alpha$ between its mounting plane 42 which is parallel to the longitudinal extension of the longitudinal link 40, and the direction 44 to the center of the earth. The measuring plane of the inclination sensor 28 coincides with the vertical longitudinal plane 46, while the longitudinal plane 46 extends parallel to the plane of the drawings of FIGS. 2 and 3.

FIG. 2 shows the vehicle which is not loaded or loaded only slightly. Therefore the structure 12 of the vehicle has a distance e1 from the roadway 18, and an angle $\alpha$1 is detected by the inclination sensor unit 28. In FIG. 3 the vehicle is substantially loaded, so that the structure 12 of the vehicle has a smaller distance e2 from the roadway 18. In the event of the spring deflection of the vehicle structure 12, the angular position of the longitudinal link 40 changes and correspondingly a greater angle $\alpha$2 between the mounting plane 42 and the direction 44 to the center of the earth is detected by the inclination sensor device 28. A corresponding condition is produced at the front axle 22 of the vehicle for the inclination sensor unit 24 arranged on it. The measuring plane of the inclination sensor unit 24 extends also as a vertical longitudinal plane relative to the roadway 18. With the inclination sensor units 24 and 28 of the front axle 22 and the rear axle 26 of the vehicle, the signals about the change of the angle $\alpha$ at the front axle 22 and the rear axle 26 are supplied to the evaluating-device 32.

The additional inclination sensor unit 30 arranged on the headlight housing 13 or on the body 12 of the vehicle detects the inclination angle changes of the body 12 and its measuring plane extends preferably at least approximately as a vertical longitudinal plane relative to the roadway 18 and thereby at least approximately parallel to the measuring plane 46 of the inclination sensor units 24 and 28 arranged on the axles 22 and 26. With the inclination sensor unit 30, the evaluating device 32 supplies signals about the inclination angle change of the body 12 of the vehicle.

The geometrical relationship between the signals of the inclination sensor devices 24, 28, 30 and their processing by the evaluating device 32 is illustrated hereinbelow. With the inclination sensor device 24 of the front axle 22 the following measuring value is determined $$B = \alpha v + \beta + \gamma \quad (1)$$

wherein $\alpha v$ is an angle between the mounting plane 42 of the inclination sensor unit 24 and the direction toward the center of the earth, $\beta$ is an inclination of the roadway 18, and $\gamma$ is an inclination of the vehicle structure or the body 1. With the inclination sensor unit 28 of the rear axle 26 the following measuring value is determined:

$$C = \alpha h + \beta + \gamma \quad (2)$$

wherein $\alpha h$ is an the angle between the mounting plane 42 of the inclination sensor unit 24 and the direction 44 to the center of the earth. With the additional inclination sensor unit 30 the following measuring value is determined:

$$A = \beta + \gamma \quad (3)$$

for the inclination angle $\gamma$ of the vehicle structure or the body 12, moreover, the following relationship can be provided:

$$\tan \gamma = (lh\,\alpha h - lv\,\alpha v)/R \quad (4)$$

wherein lh is the length of the longitudinal link 40 of the rear axle 26, lv is a length of the longitudinal link 40 of the front axle 22 and R is a wheel base which means a distance between the front axle 22 and the rear axle 26. From the equations 1–4, the inclination angle $\gamma$ can be determined from the following equation:

$$\tan \gamma = [lh(C-A) - lv(B-A)]/R \quad (5)$$

Thereby the angle $\beta$ can be eliminated and independently from it the inclination $\gamma$ of the vehicle relative to the roadway 18 can be determined, and the light width of the light beam emitted by the headlight 10 can be maintained constant. By these equations also side inclinations of the roadway 18 and/or the body 12 of the vehicle can be eliminated so that they do not lead to inaccurate adjustments of the light width of the light beam emitted form the headlight 10.

Alternatively to the above described arrangement of the inclination sensor units 24 and 28 on the longitudinal links of the axles 22 and 26 of the vehicle, they can be also arranged in the modified embodiment shown in FIG. 4 on the transverse links 50 of the axles. The transverse links 50 are supported turnably about a horizontal longitudinal axis on their inner end regions, and on their outer end regions the wheels 55 of the vehicle are articulately connected. The measuring planes of the inclination sensor units 24 and 28 extend as vertical transverse planes 52 which extend perpendicularly to the roadway 18 and perpendicularly to the vertical longitudinal plane 15 of the vehicle. The additional sensor unit 30 arranged on the structure or the body 12 of the vehicle is arranged so that its measuring plane also extends as a vertical transverse plane, which is at least approximately parallel to the measuring planes 52 of the inclination sensor units 24 and 28 of the axles 22 and 26.

In an alternative embodiment shown in FIG. 5 the inclination sensor units 24 and 28 can also be arranged on the torsion bars 60 of the axles. The torsion bars 60 are arranged in vertical transverse planes 62 and they can be twisted or pivoted about their longitudinal axes 61. The torsion bars 60 are attached at their inner end regions to the vehicle body 12 and their outer end regions are connected to the wheels 65. The measuring planes 64 of the inclination sensor units 24 and 28 extend parallel to the vertical transverse planes 62 perpendicular to the longitudinal axes 61. Here as in the previous embodiment the additional inclination sensor 30 is arranged in the vehicle body so that its measuring plane is approximately parallel to the measuring planes 64 of the inclination sensor units 24 and 28 of the axles 22 and 26.

An adjustment of the inclination sensor units 24, 28, 30 relative to the parts of the axles 22 and 26, on which they are arranged is not necessary. It suffices to supply through the evaluating device 32 the zero signals or the offset signals of the inclination sensor units 24, 28, 30 in a base position of the vehicle, in which it is arranged on a flat roadway in unloaded condition. The changes of the axial signals are processed started from these offset signals. The headlights 10 are adjusted by the base adjustment units so that the light width of the light beam emitted by it in the presence of the offset signals of the inclination sensor units 24, 28 and 30 is correctly adjusted. The evaluating device 32 can receive, in addition to the signals of the inclination sensor units 24, 28 and 30 also further signals, such as for the traveling speed of the vehicle or an actuation of the brake.

It can be further provided that an evaluation of the signals of the inclination sensor units 24, 28 and 30 and a control of the adjusting unit 20 is performed only with a standing vehicle, whereby then a so-called static automatic light width regulation is performed. Alternatively, also it can be performed in a traveling vehicle, whereby then a so-called dynamic automatic light width regulation is performed. With the traveling vehicle, moreover a time filtering or averaging of the signals of the inclination central units 24, 28 and 30 is performed for filtering out short-time changes of the signals and providing a control of the adjusting units 20 only in the event of long last changes of the inclination γ of the vehicle. It can be provided that the signals of the individual inclination sensor units 24, 28 and 30 are filtered differently, according to the disturbing influence of the vertical and horizontal accelerations of the vehicle or its body 12. In addition or alternatively, also the total signal determined from these individual signals for the inclination angle γ of the vehicle can be filtered. The filtering can be performed by software of the control unit 32, for example depending on the traveling speed of the vehicle for various traveling situations in a different way.

It will be understood that each of the elements described above, or two or more together, may also find a useful application in other types of constructions differing from the types described above.

While the invention has been illustrated and described as embodied in device for regulating light width of headlights for vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for controlling headlights of a vehicle, said vehicle including a vehicle body; at least one front wheel and at least one rear wheel mounted in said vehicle body by means of a suspension system; the headlights mounted in the vehicle body; a first link element of the suspension system pivotally connected between the at least one front wheel, or a front axle for the at least one front wheel, and the vehicle body; a second link element of the suspension system pivotally connected between the at least one rear wheel, or a rear axle of the at least one rear wheel, and the vehicle body; and a device for controlling said headlights; and wherein said device for controlling said headlights comprises respective adjusting units (20) for adjusting said headlights to vary light widths of said headlights (10);

a first sensor unit (24) for measuring a first angle between a first mounting plane of the first sensor unit (24) and a direction (44,64) to the center of the earth, said first sensor unit (24) being mounted so that said first mounting plane extends on said first link element (40,50,60) pivotally connected between said at least one front wheel or said front axle (22) and said vehicle body (12);

a second sensor unit (28) for measuring a second angle between a second mounting plane and a direction (44) to the center of the earth, said second sensor unit (28) being mounted so that said second mounting plane extends on said second link element (40,50,60) connected between said at least one rear wheel or said rear axle (26) and said vehicle body (12);

a third sensor unit (30) for measuring a third angle of a third mounting plane of said third sensor unit relative to horizontal, said third sensor unit (30) being mounted so that said third mounting plane extends in and is fixed in relation to said vehicle body (12); and an evaluating unit (32) connected to said first, second and third sensor units to receive respective signals therefrom according to said first, second and third angles measured by said sensor units and connected to said adjusting units for adjusting said headlights, said evaluating unit including means for controlling said adjusting units to control said light widths of said headlights (10) according to said first, second and third angles.

2. The device as defined in claim 1, wherein said first link element and said second link element are longitudinal links of said suspension system.

3. The device as defined in claim 1, wherein said first link element and said second link element are transverse links of said suspension system.

4. The device as defined in claim 1, wherein said first link element and said second link element are torsion bars of said suspension system.

5. A device for controlling headlights of a vehicle, said device comprising respective adjusting units (20) for adjusting the headlights (10) to vary light widths of the headlights (10); a first sensor unit (24) for measuring a first angular orientation of a first mounting plane of the first sensor unit (24), said first sensor unit (24) being mounted on a first link element pivotally connected between at least one front wheel and a vehicle body (12) of the vehicle; a second sensor unit (28) for measuring a second angular orientation between a second mounting plane of the second sensor unit (28), said second sensor unit being mounted on a second link element (40,50,60) pivotally connected between at least one rear wheel and the vehicle body (12); a third sensor unit (30) for measuring a third angular orientation of a third mounting plane extending in and fixed in relation to the vehicle body (12); and an evaluating unit (32) for controlling the adjusting units to adjust the light widths of the headlights (10) according to the first, second and third angular orientation measured by the sensor units.

6. A vehicle resting or traveling on a roadway, said vehicle including a vehicle body (12), at least one front wheel and at least one rear wheel (55,65) mounted by means of a suspension system in the vehicle body (12), headlights (10) mounted in the vehicle body, a first link element (40,50,60) of the suspension system pivotally connected between the at least one front wheel, or a front axle for the at least one front wheel, and the vehicle body; a second link element (40,50, 60) pivotally connected between the at least one rear wheel, or a rear axle of the at least one rear wheel, and the vehicle body; and a device for controlling said headlights; said device for controlling said headlights comprising respective adjusting units (20) for adjusting said headlights to vary light widths of said headlights (10);

a first sensor unit (24) for measuring a first angle between a first mounting plane of the first sensor unit (24) and a direction (44,64) to the center of the earth, said first sensor unit (24) being mounted so that said first mounting plane extends on said first link element (40,50,60) pivotally connected between said at least one front wheel or said front axle (22) and said vehicle body (12);

a second sensor unit (28) for measuring a second angle between a second mounting plane and a direction (44) to the center of the earth, said second sensor unit (28)

being mounted so that said second mounting plane extends on said second link element (40,50,60) connected between said at least one rear wheel or said rear axle (26) and said vehicle body (12);

a third sensor unit (30) for measuring a third angle of a third mounting plane of said third sensor unit relative to horizontal, said third sensor unit (30) being mounted so that said third mounting plane extends in and is fixed in relation to said vehicle body (12); and an evaluating unit (32) connected to said first, second and third sensor units to receive respective signals therefrom according to said first, second and third angles measured by said sensor units and connected to said adjusting units for adjusting said headlights, said evaluating unit including means for controlling said adjusting units to control said light widths of said headlights (10) according to said first, second and third angles.

7. The vehicle as defined in claim 6, wherein said third sensor unit is arranged in a housing of one of said headlights (10).

8. The vehicle as defined in claim 7, wherein said first link element and said second link element are longitudinal links of said suspension system.

9. The vehicle as defined in claim 8, wherein said first link element and said second link element are transverse links of said suspension system.

10. The vehicle as defined in claim 9, wherein said first link element and said second link element are torsion bars of said suspension system.

* * * * *